(12) United States Patent
Phillips

(10) Patent No.: US 8,031,207 B2
(45) Date of Patent: Oct. 4, 2011

(54) CARD IMAGE DESCRIPTION FORMAT TO ECONOMIZE ON DATA STORAGE

(75) Inventor: Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 754 days.

(21) Appl. No.: 12/170,550

(22) Filed: Jul. 10, 2008

(65) Prior Publication Data

US 2009/0303250 A1 Dec. 10, 2009

Related U.S. Application Data

(60) Provisional application No. 61/058,704, filed on Jun. 4, 2008.

(51) Int. Cl.
*G09G 5/00* (2006.01)
*G06F 17/00* (2006.01)
*G06Q 40/00* (2006.01)
*G06K 5/00* (2006.01)

(52) U.S. Cl. ........ 345/619; 715/221; 715/224; 235/379; 235/380

(58) Field of Classification Search ............... 345/619
See application file for complete search history.

(56) References Cited

U.S. PATENT DOCUMENTS

| | | | |
|---|---|---|---|
| 7,806,338 B1 * | 10/2010 | Behner et al. | 235/488 |
| 2004/0099730 A1 * | 5/2004 | Tuchler et al. | 235/380 |
| 2006/0261174 A1 * | 11/2006 | Zellner et al. | 235/492 |
| 2009/0173784 A1 * | 7/2009 | Yang | 235/380 |

* cited by examiner

*Primary Examiner* — Andrew Wang
*Assistant Examiner* — Wynton S Jones
(74) *Attorney, Agent, or Firm* — Buckley, Maschoff & Talwalkar LLC

(57) ABSTRACT

A mobile telephone displays an image of a payment card in connection with a contactless payment function implemented in the mobile telephone. The mobile telephone constructs the payment card image from separate image elements. Data which represents at least some of the image elements is stored in an image data format which includes at least some dedicated storage fields for the various image elements.

16 Claims, 6 Drawing Sheets

CARD IMAGE DESCRIPTION FORMAT TO ECONOMIZE ON DATA STORAGE

CROSS-REFERENCE TO RELATED APPLICATION

This application claims the benefit of U.S. provisional patent application Ser. No. 61/058,704, filed Jun. 4, 2008, entitled "Enhanced User Interface for Contactless Payment Function in Mobile Telephone", which is incorporated herein by reference.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader which is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal which is transmitted by the proximity reader and received by the card antenna.

MasterCard International Incorporated, the assignee hereof, has established a widely-used standard, known as "PayPass", for interoperability of contactless payment cards and proximity readers.

It has been proposed that the capabilities of a contactless payment card be incorporated into a mobile telephone, thereby turning the mobile telephone into a contactless payment device. Typically a mobile telephone/contactless payment device includes integrated circuitry with the same functionality as the RFID IC of a contactless payment card. In addition, the mobile telephone/contactless payment device includes a loop antenna that is coupled to the payment-related IC for use in sending and/or receiving messages in connection with a transaction that involves contactless payment.

In the above-referenced provisional patent application, the present inventor has proposed an improved user interface for a contactless payment application in a mobile telephone. In connection with the proposed user interface the contactless payment application in the mobile telephone displays one or more images of payment cards for which the relevant information has been loaded into the mobile telephone. Both front and rear side images of the payment cards may be displayed in connection with the proposed user interface.

The secure data storage capacity available for use in a mobile telephone by the contactless payment application may be a relatively scarce resource, and it may therefore be desirable to reduce the amount of data storage capacity required in connection with the payment card images for the proposed user interface.

DETAILED DESCRIPTION

In general, and for the purpose of introducing concepts of embodiments of the present invention, a mobile telephone is loaded with a contactless payment application and with data specific to one or more payment card accounts owned by the user of the mobile telephone. The account-specific data includes image data stored in a format that saves storage space by allowing the contactless payment application to use discrete image elements to construct a bitmap image of the front and rear sides of the corresponding payment cards.

Figure 1:
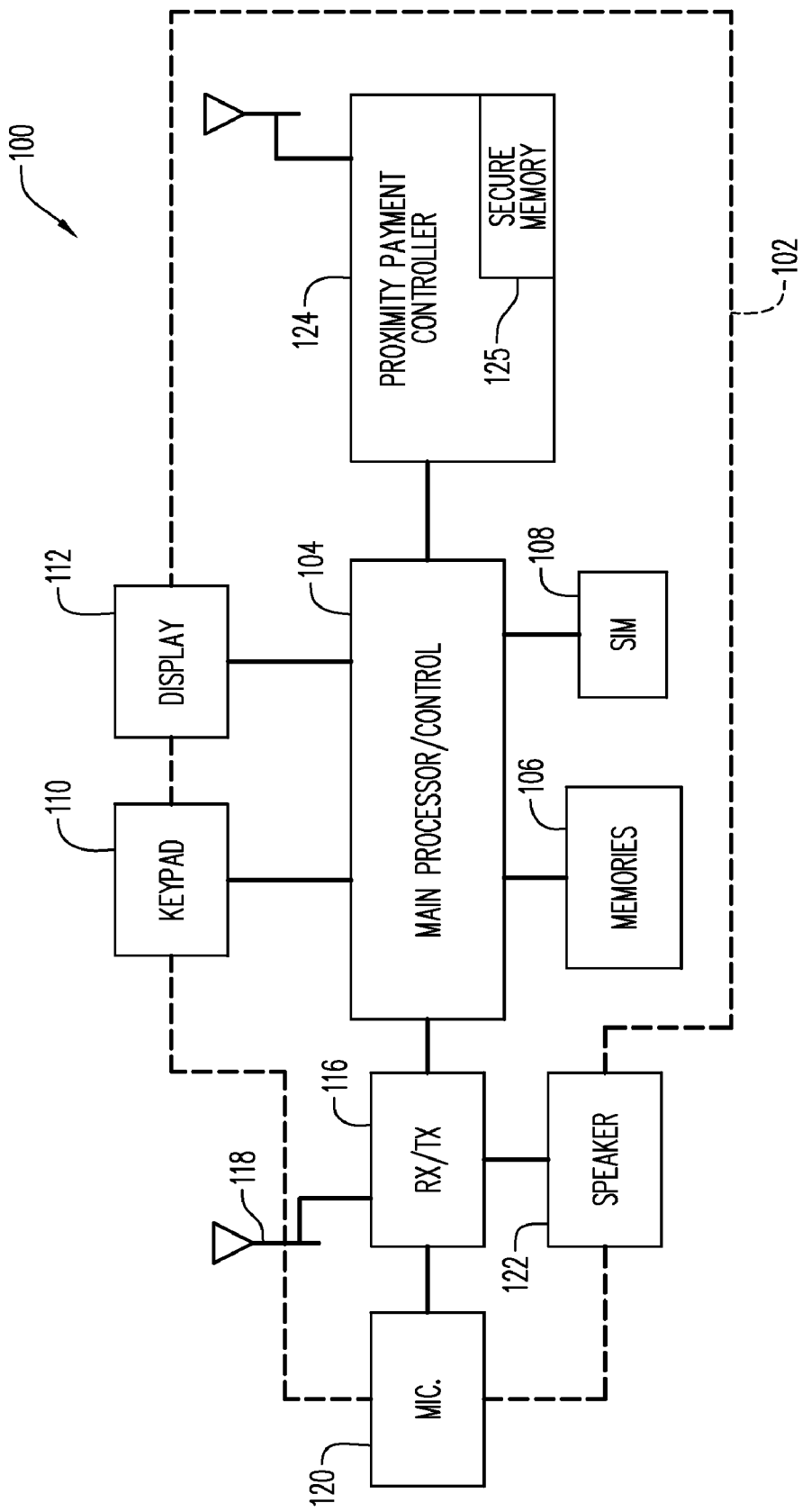
FIG. 1 is a schematic block diagram of a mobile telephone/contactless payment device according to some embodiments.

FIG. 1 is a schematic block diagram of an example embodiment of a mobile telephone/contactless payment device 100. (FIG. 1 does not necessarily represent the physical layout of the mobile telephone/contactless payment device 100.) In its hardware aspects, the mobile telephone/contactless payment device 100 may be entirely conventional.

The mobile telephone/contactless payment device 100 may include a conventional housing (indicated by dashed line 102 in FIG. 1) that contains and/or supports the other components of the mobile telephone/contactless payment device 100. The mobile telephone/contactless payment device 100 further includes conventional control circuitry 104, for controlling over-all operation of the mobile telephone/contactless payment device 100. Other components of the mobile telephone/contactless payment device 100, which are in communication with and/or controlled by the control circuitry 104, include: (a) one or more memory devices 106 (e.g., program and working memory, etc.); (b) a conventional SIM (subscriber identification module) card 108; (c) a conventional keypad 110 for receiving user input; and (d) a conventional display component 112 for displaying output information to the user.

The mobile telephone/contactless payment device 100 also includes conventional receive/transmit circuitry 116 that is also in communication with and/or controlled by the control circuitry 104. The receive/transmit circuitry 116 is coupled to an antenna 118 and provides the communication channel(s) by which the mobile telephone/contactless payment device 100 communicates via the mobile network (not shown). The mobile telephone/contactless payment device 100 further includes a conventional microphone 120, coupled to the receive/transmit circuitry 116. Of course, the microphone 120 is for receiving voice input from the user. In addition, a loudspeaker 122 is included to provide sound output to the user, and is coupled to the receive/transmit circuitry 116.

In conventional fashion, the receive/transmit circuitry 116 operates to transmit, via the antenna 118, voice signals generated by the microphone 120, and operates to reproduce, via the loudspeaker 122, voice signals received via the antenna 118. The receive/transmit circuitry 116 may also handle transmission and reception of text messages and/or other data communications via the antenna 118.

The mobile telephone/contactless payment device 100 may also include an integrated circuit (IC) or chipset 124 of the kind embedded in contactless payment cards. The IC/chipset 124 may also be referred to as a "payment circuit". The payment circuit 124 may include a secure memory (data storage) component 125 for storing a contactless payment application program and as well as information that is specific to one or more payment card accounts which have been issued to the individual who owns the mobile telephone/contactless payment device 100. Further, the mobile telephone/contactless payment device 100 may include a loop antenna 126, coupled to the payment circuit 124. The payment circuit 124 may operate so as to interact with an RFID/NFC proximity reader of a POS terminal to provide the payment card account number (stored in the payment circuit 124) for a purchase transaction at the POS terminal. For example, the payment circuit 124 may be designed/programmed to operate in accordance with the above-mentioned "PayPass" standard.

In accordance with aspects of the present invention, the secure memory 125 may store payment card image data in a format which is described below. Further, a contactless payment application may be stored in the secure memory 125 and may control the proximity payment IC/chipset 124 and/or the control circuitry 104 in a novel manner in connection with displaying payment card images on the display component 112.

Figure 2:
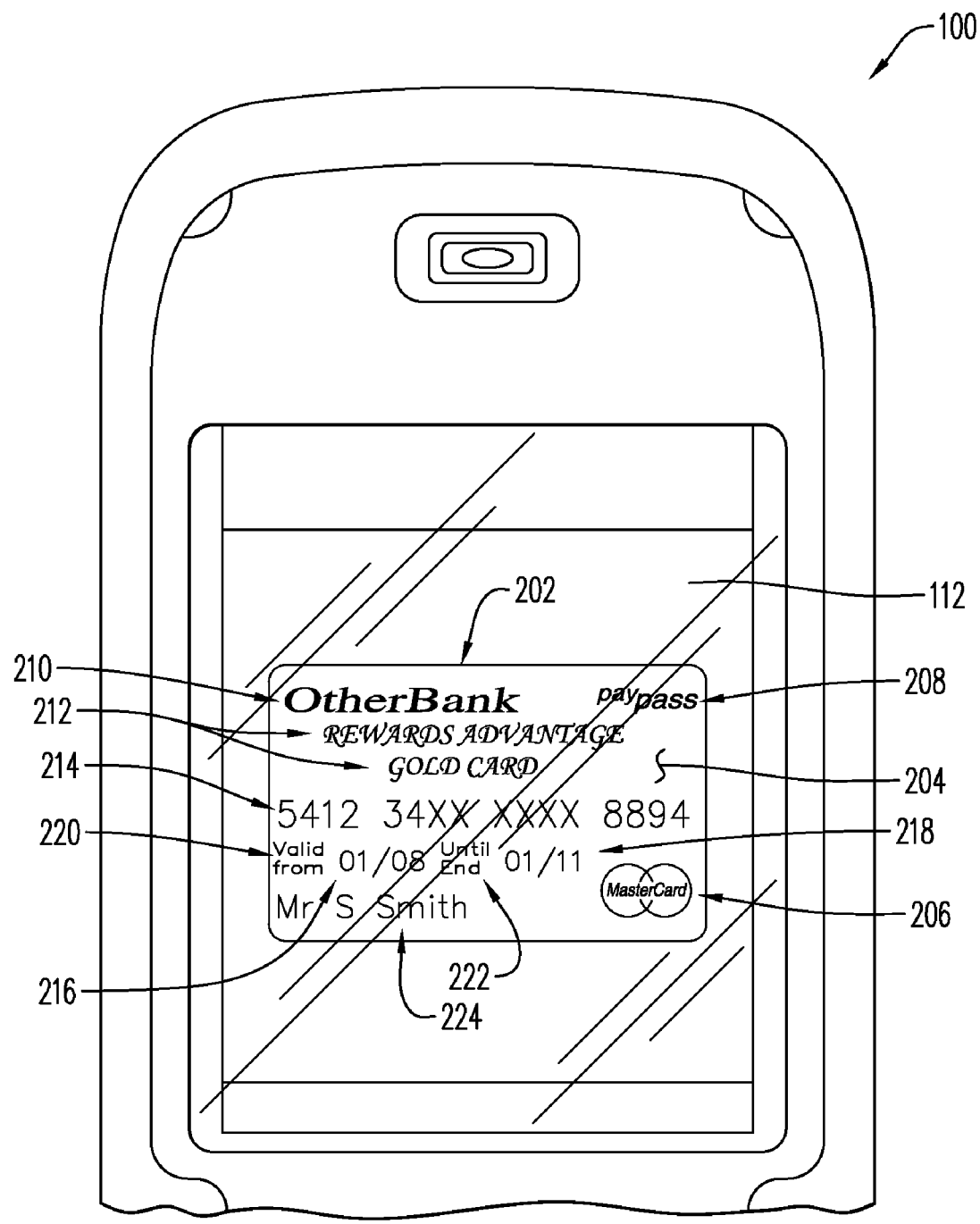
FIG. 2 is a plan view of the mobile telephone in a flipped open condition showing a display of a payment card image in accordance with aspects of the present invention.

FIG. 2 is a plan view of the mobile telephone 100 in a flipped open condition with the display component 112 visible and displaying an example screen display that presents a front side image 202 of a payment card in accordance with aspects of the present invention. It will be appreciated that the front side image 202 represents the front side of a payment card which has been issued by a financial institution (the "issuer") to the owner of the mobile telephone 100.

As seen in FIG. 2, the front side image has the following elements: (a) a background 204, (b) a payment association logo 206 (MasterCard International Inc., the assignee hereof, is a prominent example of a payment association), (c) a service logo 208 of the payment association, (d) the issuer's logo 210, (e) secondary branding text 212 provided by the issuer, (f) the payment card account number 214, (g) valid from and expiration dates 216 and 218, respectively, (h) labeling text 220, 222 for the valid from and expiration dates, and (i) the cardholder's name 224.

Figure 3:
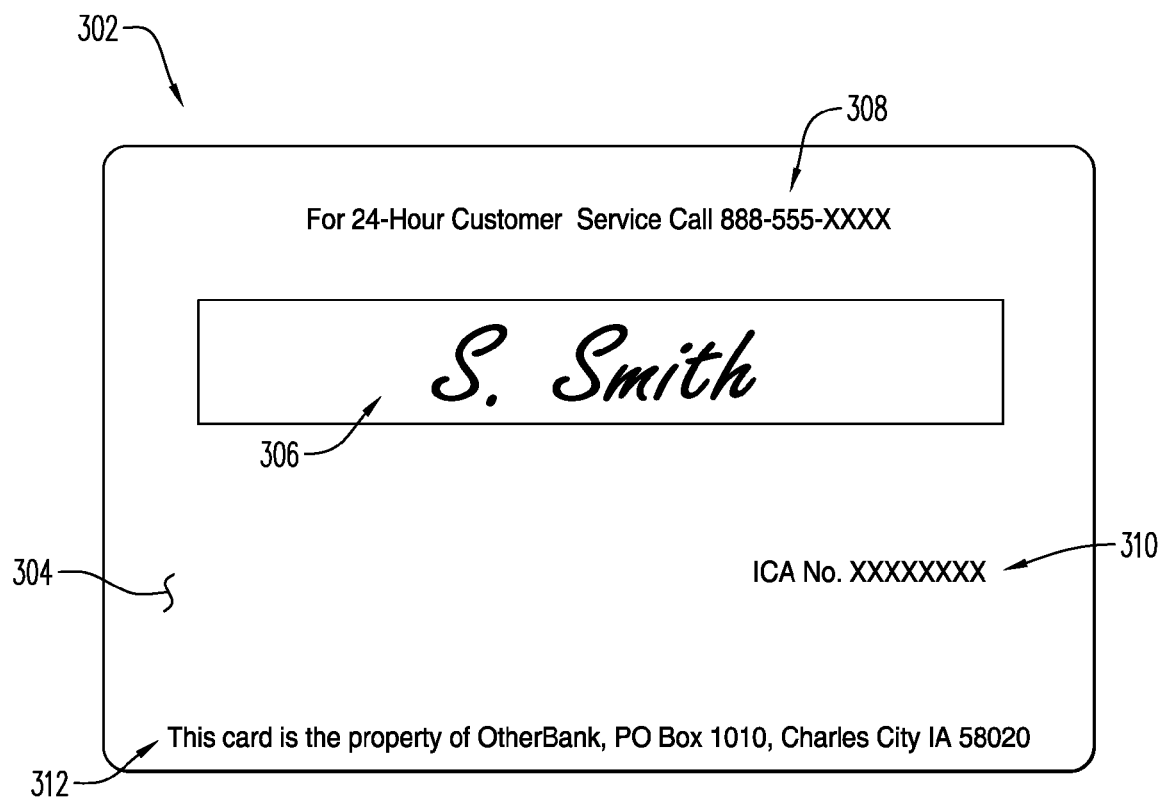
FIG. 3 shows a screen display representation of the rear side of a payment card as the screen display may appear in on the display component of the mobile telephone in accordance with aspects of the present invention.

FIG. 3 shows another screen display 302 that may be presented in accordance with aspects of the invention on the display component 112 (not shown in FIG. 3.) The screen display 302 is a rear side image of the payment card referred to in connection with FIG. 2, and represents the rear side of that payment card.

The rear side image 302 has the following elements: (a) a background 304, which may be the same color as the background 204 shown in FIG. 2, (b) an image 306 of the cardholder's handwritten signature, (c) text and numeric information 308 regarding the issuer's customer service telephone number, (d) an ICA (Interbank Card Association) number 310 for the issuer, and (e) additional text 312 (in this example, text relating to terms and conditions and the issuer's mailing address).

Figure 4:
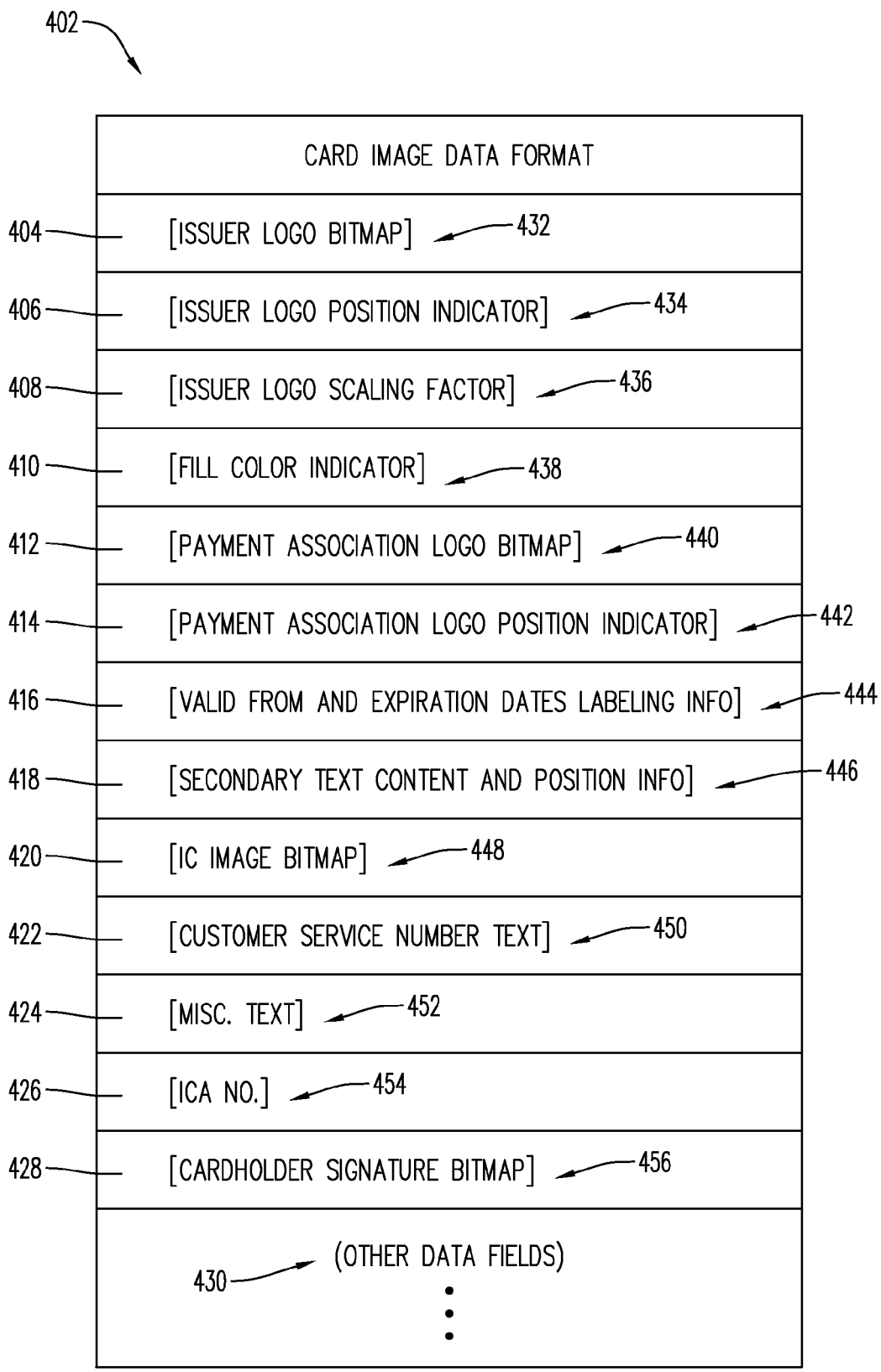
FIG. 4 is a schematic representation of a data structure which may be employed in accordance with aspects of the present invention for storing image data in the mobile telephone.

FIG. 4 is a schematic representation of a data structure 402 which may be employed in accordance with aspects of the present invention for storing image data in the secure memory 125 of the proximity payment IC/chipset 124 in the mobile telephone 100. In particular, the data structure 402 provides a format for storing image data for image elements from which a contactless payment application stored in the secure memory 125 may construct the front side image 202 and the rear side image 302 as needed.

The data structure 402 includes data storage fields 404, 406, 408, 410, 412, 414, 416, 418, 420, 422, 424, 426 and 428 which are explicitly shown in FIG. 4. Although for purposes of presentation the data storage fields 404-428 are shown in the same size, in practice, the amount of data storage capacity dedicated to these data storage fields may vary significantly. For example, some of the data storage fields are dedicated to storing image bit maps for elements of the payment card images, and thus may be allocated a considerable number of bytes of data storage capacity. Other data storage fields, however, may require only a few bytes to a few dozen bytes.

The data structure may include other data storage fields (indicated at 430) in addition to the data storage fields that are explicitly shown in FIG. 4.

The data storage field 404 is dedicated to storing a bitmap representation of the issuer's logo (such as the logo 210 shown in FIG. 2). The bitmap data that may be stored in data storage field 404 is indicated at 432. The size and resolution for the bitmap data may be standardized to fit the amount of data storage capacity for the data storage field 404.

The data storage field 406 is dedicated to storing data that indicates the position of the issuer logo in the front side image 202. The position indicator data itself is indicated at 434. The position indicator may, for example, indicate the location in the front side image of the top left corner of the issuer logo. (In the case of this and other position indicating data, if the image element in question lacks a clearly defined top left corner in itself, then the position indicator is taken to indicate the location for the top left corner of a rectangular envelope for the image element.)

The data storage field 408 is dedicated to storing a scaling factor by which the issuer can indicate whether and to what extent the issuer logo is to be stretched or shrunk from the standard size of the bitmap data 432. The scaling factor itself is indicated at 436.

The data storage field 410 is dedicated to storing an indicator as to a fill color (i.e., a background color) that is to be employed for all portions of the front and rear side images 202 and 302 not otherwise prescribed by another image element. Thus the fill color indicator prescribes the color for the backgrounds 204 and 304 referred to above. The fill color indicator itself is indicated at 438 in FIG. 4.

The data storage field 412 is dedicated to storing a bitmap representation of the payment association logo (e.g., logo 206, FIG. 2). The bitmap data that may be stored in data storage field 412 is indicated at 440. The size and resolution for the payment association logo bitmap data may be standardized to fit the amount of data storage capacity for the data storage field 412.

The data storage field 414 is dedicated to storing data that indicates the position of the payment association logo in the front side image 202. The payment association logo position indicator data itself is indicated at 442. The position indicator may, for example, indicate the location in the front side image of the top left corner of the issuer logo.

The data storage field 416 is dedicated to storing text or other information for displaying labels (such as labels 220, 222 in FIG. 2) for the valid from and expiration dates 216, 218 to be displayed in the front side image 202. The label information and position indicators therefor are indicated at 444 in FIG. 4.

The data storage field 418 is dedicated to storing text and position information for secondary branding (e.g., 212 in FIG. 2) specified for the payment card by the issuer. The secondary branding information is itself indicated at 446 in FIG. 4.

The data storage field 420 is dedicated to storing a bitmap representation of an image of an integrated circuit (IC). As will be appreciated by those who are skilled in the art, some payment cards include an IC as a visible feature. To provide a reasonably accurate image of the face of such payment cards, a representation of the visible IC would be required. Thus the data storage field 420 is for storing the bitmap image for the IC image that would be needed in such cases. The IC image bitmap data itself is indicated at 448. In at least some embodiments, no position indicator is necessary, since the position of the IC image may correspond to a standard position for an IC in a standard card format.

The data storage field 422 is dedicated to storing text and/or numeric information, as well as a position indicator for the issuer's customer service telephone number, as shown for example at 308 in the rear side image (FIG. 3). The customer service telephone number information itself is indicated at 450 in FIG. 4. The position indicator may indicate where in the rear side image the customer service telephone number is to be displayed.

The data storage field 424 is dedicated to storing miscellaneous text information, as well as, possibly, position indicator(s) for the text information. The miscellaneous text information may include, for example, terms and conditions relating to the payment card in question, and/or license information, and/or the issuer's mailing address. The position indicator(s) may, for example, indicate at what position(s) in the rear side image the miscellaneous text is to be displayed. The miscellaneous text information itself is indicated at 452 in FIG. 4. An example of how miscellaneous text information may be displayed in the rear side image is indicated at 312 in FIG. 3.

Continuing to refer to FIG. 4, the data storage field 426 is dedicated to storing an ICA (Interbank Card Association) number that pertains to the issuer of the payment card in question, and also may store a position indicator for the ICA number, for indicating where the ICA number is to be displayed in the front or rear side image. The ICA number itself is indicated at 454 in FIG. 4.

The data storage field 428 is dedicated to storing a bitmap image that represents the cardholder's handwritten signature (as shown at 306 in FIG. 3). The bitmap itself is indicated at 456 in FIG. 4. The position for the display of the signature may be a standard position in the rear side image.

In the case of some of the data storage fields, a null data indicator may be stored therein instead of actual data. For example, if no ICA number is to be displayed, a null indicator (not shown) is present in place of the data indicated at 454 in FIG. 4.

Figure 5A:
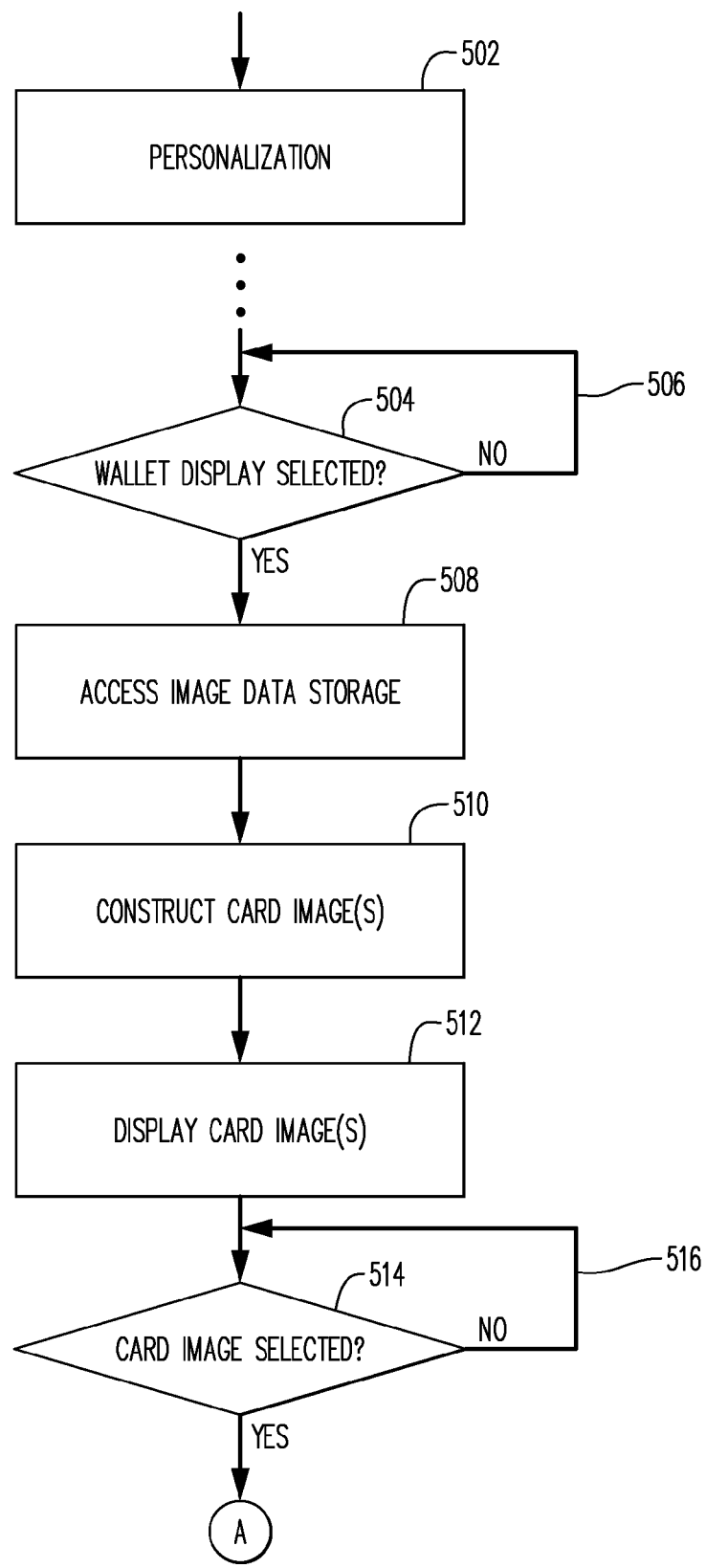
FIGS. 5A and 5B together form a flow chart that illustrates a process that may be performed in the mobile telephone in accordance with aspects of the present invention.
Figure 5B:
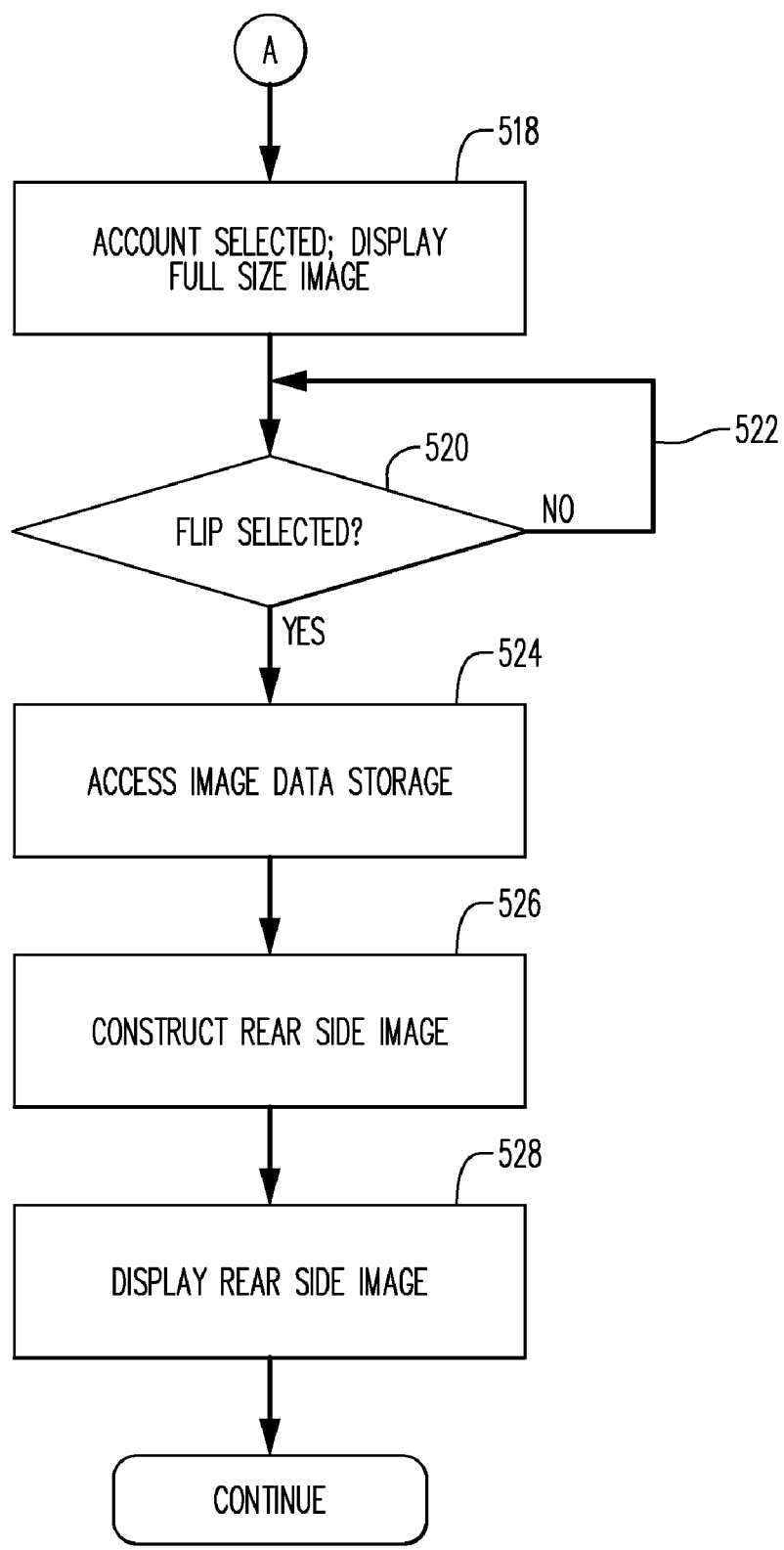

FIGS. 5A and 5B together form a flow chart that illustrates a process that may be performed in the mobile telephone 100 in accordance with aspects of the present invention.

Block 502 in FIG. 5A represents a procedure in which card-specific information is loaded into the mobile telephone 100 to allow the mobile telephone 100 to engage in purchase transactions using the payment card account in question. In part, this procedure may be performed in a conventional manner to load the payment card account number and other information into the mobile telephone 100. As is conventional, this procedure may be referred to as "personalization". Further, and in accordance with aspects of the present invention, the personalization procedure may include loading into the mobile telephone 100 the image data required to allow the mobile telephone 100 to construct the front and rear side card images of which examples are shown in FIGS. 2 and 3. The image data in question may be stored in the card image data format data structure 402 shown in FIG. 4 and contained in the secure memory 125 (FIG. 1).

Personalization may be performed in any manner which has previously been proposed, including loading of the relevant data at the factory or at a mobile telephone store, or via an over-the-air (OTA) process, or via a contactless personalization card brought into proximity to the mobile telephone for wireless exchange of information between the personalization card and the mobile telephone. Reference is made to commonly assigned application Ser. Nos. 11/870,114; 12/031,317 and 11/958,695 in regard to various personalization techniques.

As will be understood from the above-mentioned provisional patent application, it may be the case for a particular mobile telephone 100 that it is personalized on several occasions to load card-specific information relating to several different payment cards/payment card accounts. In each case, the personalization procedure may include loading of card image data into the mobile telephone 100.

Referring again to FIG. 5A, after at least one personalization procedure has been performed, the process may later reach decision block 504. At decision block 504, it is determined whether the user of the mobile telephone 100 has selected the "virtual wallet" display. This may be done, for example, by selecting the wallet icon as shown in FIG. 3 of the above-mentioned provisional patent application. If the wallet display is not selected, then the process of FIG. 5A idles, as shown at branch 506 from decision block 504. However, if it is determined at decision block 504 that the wallet display is selected, then the process advances from decision block 504 to block 508.

At block 508, the proximity payment controller 124 and/or the main control circuit 104 accesses the secure memory 125 to retrieve the image data that defines the front side image(s) for one or more payment cards for which the mobile telephone 100 has been personalized. Then at 510, the proximity payment controller 124 and/or the main control circuit 104 constructs the front side image(s) for the payment card(s) in question from the retrieved card image data, and at 512 the proximity payment controller 124 and/or the main control circuit 104 displays the front side card image(s) on the display component 112 of the mobile telephone 100. For example, a card selection menu display screen as in FIG. 4 of the above-mentioned provisional patent application may be presented.

With the card selection menu screen display presented, the process of FIG. 5A may advance from block 512 to decision block 514. At decision block 514, it is determined whether the user has selected one of the card images from the card selection menu screen display. If not, the process of FIG. 5A idles, as indicated at branch 516 from decision block 514. However, if it is determined at decision block 514 that one of the card images has been selected, then the process may advance from decision block 514 to block 518 in FIG. 5B. At 518, the mobile telephone 100 (e.g., via the proximity payment controller 124) may determine that the payment card account corresponding to the selected card image has been selected for use in a purchase transaction. To evidence this determination, the selected card image may be displayed full size, as in FIG. 2 of the present disclosure.

The mobile telephone 100 may construct a card image, as per step 510 (FIG. 5A) for display at step 512 or 518 (FIG. 5B), in the following manner. First the mobile telephone 100 may establish a card-shaped background 204 (FIG. 2) in a color as defined by the color indicator 438 (FIG. 4), stored in the card image data format 402. Next, the mobile telephone 100 may superimpose the issuer logo 210 (FIG. 2), as defined by bitmap 432 (FIG. 4), on the background 204 at a location indicated by position indicator 434 (FIG. 4). If the scaling factor 436 is other than 100%, the issuer logo 206 may be scaled in accordance with the scaling factor. Similarly, the mobile telephone 100 superimposes secondary branding information 212 against the background based on text content and position information 446 from FIG. 4.

In addition, the mobile telephone 100 may superimpose the payment association logo 206 (FIG. 2), as defined by bitmap 440 (FIG. 4), on the background 204 at the location indicated by position indicator 442. The mobile telephone 100 also superimposes valid from and expiration date labels on the background based on the information 444 from FIG. 4. The actual dates themselves are retrieved from separate card-specific information loaded during personalization. Similarly, the card-specific account number is displayed at 214 in FIG. 4 based on information loaded during personalization and stored in a conventional manner during personalization and separately from the card image data shown in FIG. 4. Such is also the case with respect to the card holder's name, as shown at 224 in FIG. 2.

The additional service logo 208 may be generated from an additional bitmap, not explicitly shown in FIG. 4 but stored in one of the other data fields 430. A position indicator for the additional logo may also be stored in the other data fields 430.

Referring again to FIG. 5B, the process may advance from block 518 to decision block 520. At decision block 520, it is determined whether the user has selected a "flip" option. The flip option (as discussed in the above-mentioned provisional patent application in connection with FIGS. 5 and 6 of the provisional application) allows the user to view the rear side image for the card in place of the front side image shown in FIG. 2 of the present disclosure. If the user does not select the flip option, then the process of FIG. 5B idles as indicated by branch 522 from decision block 520.

If it is determined at decision block 520 that the user has selected the flip option, then the process may advance from decision block 520 to block 524. At block 524, the proximity payment controller 124 and/or the main control circuit 104 accesses the secure memory 125 to retrieve the image data that defines the rear side image for the card which corresponds to the full size front side image displayed at step 518. Then, at 526, the proximity payment controller 124 and/or the main control circuit 104 constructs the rear side image from the retrieved card image data. In particular, in constructing the rear side image, the proximity payment controller 124 and/or the main control circuit 104 may use only the image elements stored in the card image data format data structure shown in FIG. 4. These image elements may be entirely different from the front side image elements, except for the background fill color, which may be the same for both front and rear side images.

The process of constructing the rear side image may be similar to the process for constructing the front side image, except as to the particular image elements that are used. Thus it is not necessary to describe the construction of the rear side image in detail.

The process of FIG. 5B may advance from block 526 to block 528. At 528 the proximity payment controller 124 and/or the main control circuit 104 displays the rear side card image on the display component 112 of the mobile telephone 100. This screen display may, for example, be like the screen display shown in FIG. 3.

The user may show the screen display of FIG. 3 (i.e., the rear side card image) to a sales clerk to verify a signature that the user provides in connection with a purchase transaction.

By using the image data format shown in FIG. 4 to store image data corresponding to discrete image elements, instead of a bitmap for the entire image, the mobile telephone 100 may conserve on the amount of secure memory storage space required to allow for presenting payment card images on the mobile telephone display. This may be especially advantageous if it is desired to store a considerable number of card images in the mobile telephone 100.

At least some of the steps of FIGS. 5A-5B may be performed by the above-mentioned contactless payment application.

In either or both of the embodiments of the mobile telephone/contactless payment device as described above, the control device 104 and the payment circuit 124 may be combined in a single IC or in a chip set, or functions may be divided between the control device 104 and the payment circuit 124 in a manner other than as described hereinabove.

Instead of or in addition to the keypad 110 and/or the display 112, the mobile telephone/contactless payment device may include a touch screen.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A data storage device which stores a data structure, the data structure defining a data format for storing data for generating images of a payment card, said images including a front side image and a rear side image, the data format comprising:

a first field for storing a bitmap of a logo of an issuer of the payment card;

a second field for storing a first position indicator, the first position indicator for indicating a position in said front side image for said logo of said issuer;

a third field for storing a scaling factor for scaling said logo of said issuer;

a fourth field for storing color data that specifies a fill color for said front side image and said rear side image;

a fifth field for storing a bitmap of a payment association logo;

a sixth field for storing a second position indicator, the second position indicator for indicating a position in said front side image for said payment association logo;

a seventh field for storing text and position information for labeling valid from and expiration dates for the payment card;

an eighth field for storing text and position information for secondary text specified by said issuer for branding the payment card apart from said logo of said issuer;

a ninth field for storing a bitmap of an image of an IC (integrated circuit);

a tenth field for storing text and/or numeric information indicative of said issuer's customer service telephone number;

an eleventh field for storing text that specifies at least one of: (a) card terms and conditions, (b) license information and (c) said issuer's mailing address;

a twelfth field for storing an ICA (Interbank Card Association) number; and a thirteenth field for storing a bitmap of an image of a signature of a holder of said payment card.

2. The data storage device of claim 1, wherein:

said bitmap of said issuer's logo is stored in said first field;
said first position indicator is stored in said second field;
said color data is stored in said fourth field;
said bitmap of said payment association is stored in said fifth field;
said second position indicator is stored in said sixth field; and
said valid from and expiration dates labeling information is stored in said seventh field.

3. The data storage device of claim 2, wherein at least one of said third, eighth, ninth, tenth, eleventh, twelfth and thirteenth fields stores only null data.

4. The data storage device of claim 2, wherein said bitmap of said image of the cardholder's signature is stored in the thirteenth field.

5. The data storage device of claim 2, wherein said scaling factor is stored in said third field.

6. The data storage device of claim 2, wherein said secondary text and position information is stored in said eighth field.

7. The data storage device of claim 2, wherein said IC image bitmap is stored in said ninth field.

8. The data storage device of claim 2, wherein said customer service telephone number text and/or numeric information is stored in said tenth field.

9. The data storage device of claim 2, wherein said ICA number is stored in said twelfth field.

10. The data storage device of claim 1, wherein an application program is stored in said data storage device, said application program including program instructions for generating said front side image and said rear side image using information stored in at least one of said first through thirteenth fields.

11. A method comprising:

storing image information in a data storage device in a mobile telephone, the image information including data representing a plurality of logos and at least one background color indicator;

the mobile telephone using the image information to construct a first bitmap image, the first bitmap image including a background in a color indicated by the at least one background color indicator and said plurality of logos displayed against said background, said bitmap image representing a front side of a payment card; and the mobile telephone using the image information to construct a second bitmap image, the second bitmap image representing a rear side of said payment card, wherein said image information includes signature data that represents an image of a signature of a cardholder, and said signature data is used in constructing the second bitmap image.

12. The method of claim 11, further comprising:

the mobile telephone displaying said first and second bitmap images.

13. The method of claim 11, wherein said at least one background color indicator includes a first background color indicator stored in a data storage field which is dedicated to said first background color indicator.

14. The method of claim 11, wherein said image information includes at least one of: (a) position indicators for said logos; (b) a scaling factor for at least one of said logos; (c) a customer service telephone number; and (d) terms and conditions text information.

15. A data storage device storing an application program and card image data, the application program including program instructions for:

generating a card-shaped background in a color indicated by the card image data;

displaying at least two logos against said background;

displaying a numeral string against said background, said numeral string representing a payment card account number that is not included in said image data;

displaying a cardholder's name against said background, said cardholder's name not included in said image data;

displaying an expiration date against said background, said expiration date not included in said image data;

generating a second card-shaped background in said color; and displaying an image of the cardholder's signature against said second background.

16. The data storage device of claim 15, wherein said data storage device is part of a mobile telephone.

* * * * *